United States Patent Office 3,196,181
Patented July 20, 1965

3,196,181
CATALYTIC REDUCTION OF 2-OXIMINOINDANE
TO 2-AMINO-INDANE
William Edward Rosen, Summit, and Charles Ferdinand Huebner, Chatham, N.J., assignors to Ciba Corporation, New York, N.Y., a corporation of Delaware
No Drawing. Filed Mar. 1, 1963, Ser. No. 262,195
12 Claims. (Cl. 260—578)

The present invention relates to a novel method for the preparation of 2-amino-indane; this compound and its salts show excellent analgesic properties.

It has been reported [N. Levin et al., J. Org. Chem., vol. 9, p. 381 (1944)] that the reduction of 2-oxamino-indane to the desired 2-amino-indane by treatement with hydrogen in the presence of a non-pyrophoric palladium catalyst failed to take place.

We have now found that, contrary to the teaching of the prior art, 2-amino-indane can be prepared in high yields by treating 2-oximino-indane or an acid addition salt thereof with hydrogen in the presence of a non-pyrophoric palladium hydrogenation catalyst, if a non-pyrophoric palladium-on-carrier hydrogenation catalyst is used as the non-pyrophoric palladium hydrogenation catalyst, and the treaatment with hydrogen is carried out in the presence of sulfuric acid in an organic solvent selected from the group consisting of glacial acetic acid and a lower alkyl acetate.

Acid addition salts of the starting material used in the process of this invention are those with inorganic acids, e.g., hydrochloric, hydrobromic, sulfuric, phosphoric acid and the like, or organic acids, such as organic carboxylic acids, e.g., acetic, propionic, malonic, succinic, maleic, hydroxymaleic, fumaric, malic, tartaric, citric, benzoic, salicylic, 4-aminosalicylic, 2-acetoxybenzoic, nicotinic, isonicotinic acid and the like, or with organic sulfonic acids, e.g., methane sulfonic, ethane sulfonic, 2-hydroxyethane sulfonic, toluene sulfonic acid and the like.

The preferred non-pyrophoric palladium-on-carrier hydrogenation catalyst is a non-pyrophoric palladium-on-charcoal preparation containing from about one percent to about fifteen percent, preferably from about five precent to about ten percent, of palladium; such catalysts are commercially available. Corresponding palladium-on-carrier preparations have, for example, barium sulfate, aluminum oxide and the like, as carrier materials.

The amount (in percent weight) of the non-pyrophoric palladium-on-carrier hydrogenation catalyst used per weight of the 2-oximino-indane starting material is from about ten percent to about one hundred percent, preferably from about twenty percent to about fifty percent; the lower amounts, i.e., from about ten to about twenty percent, of the catalyst may be employed, if the organic solvent is pretreated with a small amount of a hydrogenation catalyst, for example, a palladium hydrogenation catalyst.

The amount of sulfuric acid used in the reduction reaction of this invention is from about one mole to about three moles, preferably about two moles, per one mole of the 2-oximino-indane starting material. One mole of the necessary quantity of sulfuric acid may be furnished, if the starting material is used in the form of its sulfuric acid addition salt. In the presence of the acid, the free base starting material forms an acid addition salt.

The preferred organic solvent is glacial acetic acid, which, if desired, may be replaced by a lower alkyl acetate, e.g. ethyl acetate and the like.

The treatment with hydrogen is carried out under atmospheric pressure, or more preferably, under a slightly increased pressure, for example, at a pressure ranging from about 20 pounds per square inch (about 1½ atmospheres) to about 70 pounds per square inch (about five atmospheres), preferably at about 40 pounds per square inch to about 50 pounds per square inch. It is performed by shaking the reaction mixture at room temperature in the hydrogen atmosphere until the uptake of hydrogen subsides or the theoretical amount of hydrogen has been absorbed.

The desired 2-amino-indane resulting from the above reaction is isolated according to known methods, for example, by removing the catalyst by filtration and, if desired, the sulfuric acid by neutralizing it with a suitable base, such as an alkali metal hydroxide, e.g., sodium hydroxide and the like.

The resulting 2-amino-indane may be obtained in the form of its free base or in the form of a salt thereof. A resulting salt may be converted into the free base, for example, by reaction with an alkaline reagent, such as an alkali metal hydroxide, e.g., lithium hydroxide, sodium hydroxide, potassium hydroxide and the like, an alkali metal carbonate, e.g., sodium or potassium carbonate or hydrogen carbonate and the like, ammonia, or any other suitable alkaline agent, or with an anion exchange preparation.

A free compound may be converted into its acid addition salt by reacting it with an acid furnishing preferably a pharmaceutically acceptable acid addition salt with one of the above acids. The free base, preferably a solution thereof in an inert solvent or solvent mixture, may be reacted with the acid or a solution thereof and the salt may then be isolated. A salt may be obtained in the form of a hydrate.

The following examples are intended to illustrate the invention and are not to be construed as being limitations thereon. Temperatures are given in degrees centigrade.

*Example 1*

A suspension of 5.0 g. (0.034 mole) of 2-oximino-indane and 2.5 g. of a non-pyrophoric, commercially available palladium-on-charcoal hydrogenation catalyst (containing 5 percent of palladium) in 76.6 ml. of glacial acetic acid and 4.0 ml. of sulfuric acid is shaken in a Parr hydrogenation apparatus at room temperature in an atmosphere of hydrogen under a pressure of 45 pounds per square inch. The hydrogen uptake subsides after 0.066 mole of hydrogen has been absorbed; the catalyst is filtered off and the filtrate is treated with 24 ml. of 6 N aqueous sodium hydroxide while cooling. The insoluble material is filtered off, the acetic acid is removed by distillation under reduced pressure and the residue is dissolved in 25 ml. of water. The aqueous solution is cooled, basified by adding 20 ml. of 50 percent aqueous potassium hydroxide and the oily organic material is extracted with five 25 ml. portions of methylene chloride. The combined organic extracts are washed with water, dried, filtered and concentrated under reduced pressure to a volume of 50 ml.

Gaseous hydrogen chloride is bubbled for three to five minutes through the concentrated methylene chloride solution while stirring and cooling; the resulting suspension is chilled overnight to −5° and the precipitate is collected, washed with cold methylene chloride and dried under reduced pressure at 60° to yield 5.28 g. of 2-amino-indane hydrochloride, M.P. 244–246° (decomposition); yield: 91.8 percent of theory. The product is homogeneous by paper chromatography and analyzes as follows:

Calculated for $C_9H_{12}NCl$ (169.66): C, 63.71%; H, 7.13%; N, 8.26%. Found: C, 63.88%; H, 7.21%; N, 8.42%.

In the above example, the 2.5 g. of the catalyst may be replaced by 1.5 g. or by 1.0 g. of the non-pyrophoric palladium-on-charcoal catalyst; the yield of the desired 2-amino-indane hydrochloride is 5.31 g. (or 92.3 percent of theory) and 4.97 g. (or 86.5 percent of theory), respectively.

*Example 2*

A mixture of 5.0 g. of 2-oximino-indane and 2.5 g. of a non-pyrophoric, commercially available palladium-on-charcoal hydrogenation catalyst in 76.6 ml. of ethyl acetate containing 4.0 ml. of concentrated sulfuric acid is shaken in a Parr hydrogenation apparatus in an atmosphere of hydrogen under a pressure of 45 pounds per square inch. After about five hours the hydrogen uptake subsides, and the treatment with hydrogen is interrupted. The reaction mixture is made basic by adding 36 ml. of a 6 N aqueous solution of sodium hydroxide, the solid material is filtered off, and the filtrate is washed with water and dried. The organic solvent is removed under reduced pressure, and the residue is taken up in 50 ml. of methylene chloride and saturated with gaseous anhydrous hydrogen chloride. After chilling overnight at —5°, the while solid material is collected, washed with cold methylene chloride and dried, giving 5.04 g. of 2-amino-indane hydrochloride, M.P. 242–245° (decomposition); yield 87.7 percent of theory.

What is claimed is:

1. In the process for the preparation of 2-amino-indane by treating a member selected from the group consisting of 2-oximino-indane and an acid addition salt thereof, with hydrogen in the presence of a non-pyrophoric palladium hydrogenation catalyst, the steps which comprise using a non-pyrophoric palladium-on-carrier hydrogenation catalyst as the non-pyrophoric palladium hydrogenation catalyst, and carrying out the treatment with hydrogen in the presence of sulfuric acid in an organic solvent selected from the group consisting of glacial acetic acid and lower alkyl acetate.

2. Process according to claim 1, which comprises using a non-pyrophoric palladium-on-charcoal preparation as the non-pyrophoric palladium-on-carrier hydrogenation catalyst.

3. Process according to claim 2, which comprises using a palladium-on-charcoal preparation containing from about one percent to about fifteen percent of palladium.

4. Process according to claim 1, which comprises using from about ten percent to about one hundred percent of the palladium-on-carrier hydrogenation catalyst per weight of 2-oximino-indane starting material.

5. Process according to claim 4, which comprises using from about twenty percent to about fifty percent of the palladium-on-carrier hydrogenation catalyst per weight of 2-oximino-indane starting material.

6. Process according to claim 1, which comprises using from about one mole to about three moles of sulfuric acid per one mole of the 2-oximino-indane starting material.

7. Process according to claim 6, which comprises using about two moles of sulfuric acid per one mole of the 2-oximino-indane starting material.

8. Process according to claim 1, which comprises using glacial acetic acid as the organic solvent.

9. Process according to claim 1, which comprises using ethyl acetate as the organic solvent.

10. Process according to claim 1, which comprises carrying out the treatment with hydrogen under a slightly increased pressure.

11. Process according to claim 10, which comprises carrying out the treatment with hydrogen at a pressure of from about 40 pounds per square inch to about 50 pounds per square inch.

12. Process according to claim 1, which comprises carrying out the treaatment with hydrogen at room temperature.

References Cited by the Examiner

UNITED STATES PATENTS 2,982,783  5/61  Schenck et al. _____ 260—571

OTHER REFERENCES

Schales, Ber. Deut. Chem., vol. 68, pp. 1943–1945 (1935).

CHARLES B. PARKER, *Primary Examiner.*